United States Patent
Behrendt

(10) Patent No.: US 12,305,620 B2
(45) Date of Patent: May 20, 2025

(54) WIND TURBINE WITH AN UP-TOWER ELECTROLYSIS SYSTEM

(71) Applicant: VESTAS WIND SYSTEMS A/S, Aarhus N (DK)

(72) Inventor: Lars Behrendt, Hornslet (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/712,905

(22) PCT Filed: Nov. 23, 2022

(86) PCT No.: PCT/DK2022/050244
§ 371 (c)(1),
(2) Date: May 23, 2024

(87) PCT Pub. No.: WO2023/093957
PCT Pub. Date: Jun. 1, 2023

(65) Prior Publication Data
US 2024/0418149 A1    Dec. 19, 2024

(30) Foreign Application Priority Data
Nov. 23, 2021 (DK) .................................. 202170579

(51) Int. Cl.
*F03D 9/19* (2016.01)
*C25B 1/04* (2021.01)
(Continued)

(52) U.S. Cl.
CPC ................. *F03D 9/19* (2016.05); *F03D 9/25* (2016.05); *F03D 80/30* (2016.05); *C25B 1/04* (2013.01); *F05B 2220/61* (2013.01)

(58) Field of Classification Search
CPC ... F03D 9/19; F03D 9/25; F03D 80/30; F03D 80/80; C25B 1/04; C25B 9/60;
(Continued)

(56) References Cited

U.S. PATENT DOCUMENTS 6,104,097 A * 8/2000 Lehoczky ............... F03B 13/00
290/43
2017/0101981 A1    4/2017 Ozcan
(Continued)

FOREIGN PATENT DOCUMENTS

KR    20120026337 A *   3/2012
KR    20120071039 A     7/2012
(Continued)

OTHER PUBLICATIONS

Danish Patent and Trademark Office, 1st Technical Examination including The Search Report for Application PA 2021 70579 dated Apr. 5, 2022.
(Continued)

*Primary Examiner* — Charles Reid, Jr.
(74) *Attorney, Agent, or Firm* — Patterson + Sheridan, LLP

(57) ABSTRACT

A wind turbine comprising a tower, a nacelle mounted rotatably on the tower via a yaw system and a hub carrying one or more wind turbine blades is disclosed. The wind turbine further comprises a generator, an AC/DC converter connected to the generator and an electrolysis system connected to a DC power output of the AC/DC converter for producing hydrogen. The electrolysis system is arranged in
(Continued)

an up-tower part of the wind turbine, e.g. in the nacelle. The wind turbine further comprises a hydrogen transport line connected to the electrolysis system for transporting hydrogen produced by the electrolysis system away from the electrolysis system, the hydrogen transport line extending along an exterior surface of the tower from the position of the electrolysis system to a lower part of the tower.

18 Claims, 9 Drawing Sheets

(51) Int. Cl.
  *F03D 9/25* (2016.01)
  *F03D 80/30* (2016.01)
(58) Field of Classification Search
  CPC ..... C25B 15/00; C25B 15/08; F05B 2220/61; Y02E 10/72; Y02E 60/36
  USPC ............................................. 290/1 R, 44, 55
  See application file for complete search history.

(56) References Cited

U.S. PATENT DOCUMENTS

| | | | | |
|---|---|---|---|---|
| 2017/0101982 | A1* | 4/2017 | Ozcan | ............... E04H 12/08 |
| 2023/0167804 | A1* | 6/2023 | Dincan | ............... F03D 9/19 290/43 |

FOREIGN PATENT DOCUMENTS

| | | |
|---|---|---|
| KR | 101358273 B1 | 2/2014 |
| WO | 2020095012 A1 | 5/2020 |
| WO | 2021098929 A1 | 5/2021 |
| WO | 2021219182 A1 | 11/2021 |

OTHER PUBLICATIONS

PCT International Search Report and Written Opinion of The International Searching Authority for Application PCT/DK2022/050244 dated Feb. 14, 2023 (Feb. 14, 2023).

* cited by examiner

WIND TURBINE WITH AN UP-TOWER ELECTROLYSIS SYSTEM

FIELD OF THE INVENTION

The present invention relates to a wind turbine comprising a tower, a nacelle and a hub carrying one or more wind turbine blades. The wind turbine of the invention further comprises an electrolysis system for generating hydrogen by means of electrical power produced by the wind turbine.

BACKGROUND OF THE INVENTION

As production of renewable electrical energy, e.g. using wind turbines or photovoltaic panels, increases, there is a need for converting some of the produced electrical energy into other kinds of energy which allow storage of the energy as well as allow the energy to be used for purposes where electrical energy is not suitable, e.g. fuel for freight ships, aircrafts, trucks, etc. This conversion of electrical energy is sometimes referred to as 'power to X'.

One widespread way of converting electrical energy into another kind of energy is to apply the electrical energy for driving an electrolysis system, thereby producing hydrogen from water. The hydrogen may then be stored, possibly after being transported to a suitable storage position via a pipeline or suitable transport vessels. The hydrogen may be used directly as fuel, or it may be used for producing other suitable products of high energy content, such as for example methane, ethanol or ammonia.

When applying electrical energy produced by wind turbines for producing hydrogen via electrolysis, the electrical energy is often supplied to a central facility, for example in the form of a substation or a so-called 'energy island', which receives electrical energy from several wind turbines, e.g. from several wind farms. This requires that the electrical energy is transported in the form of AC power, in order to minimise losses during transport. Therefore, the wind turbines are normally provided with a converter in the form of an AC/DC converter connected to the generator of the wind turbine, a DC/AC converter connected to the power grid, and a DC link interconnecting the AC/DC converter and the DC/AC converter. The AC/DC converter is sometimes referred to as a generator side converter, and the DC/AC converter is sometimes referred to as a grid side converter. The grid side converter will often be more expensive than the generator side converter.

In order to avoid transporting the electrical energy from the wind turbine to a central facility, it may be desirable to position an electrolysis system locally at or in the wind turbine. However, this introduces a possible safety hazard if hydrogen escapes and becomes present in interior parts of the wind turbine.

DESCRIPTION OF THE INVENTION

It is an object of embodiments of the invention to provide a wind turbine with an electrolysis system which is cost effective to manufacture and safe to operate.

The invention provides a wind turbine comprising a tower, a nacelle mounted rotatably on the tower via a yaw system and a hub carrying one or more wind turbine blades, the hub being mounted rotatably on the nacelle, the wind turbine further comprising a generator, an AC/DC converter connected to the generator and an electrolysis system connected to a DC power output of the AC/DC converter for producing hydrogen, the electrolysis system being arranged in an up-tower part of the wind turbine, wherein the wind turbine further comprises a hydrogen transport line connected to the electrolysis system for transporting hydrogen produced by the electrolysis system away from the electrolysis system, the hydrogen transport line extending along an exterior surface of the tower from the position of the electrolysis system to a lower part of the tower.

Thus, the invention provides a wind turbine, i.e. a structure which is capable of extracting energy from the wind and convert it into electrical energy. The wind turbine comprises a tower, a nacelle mounted rotatably on the tower, and a hub. The tower extends between a base part, which is connected to a foundation, a monopile, a transition piece, or any other suitable kind of structure which connects the wind turbine to the position where it is located, and an upper part to which the nacelle is connected.

The hub carries one or more wind turbine blades, and is mounted rotatably on the nacelle. Accordingly, wind acting on the wind turbine blades causes the hub to rotate, and the wind turbine blades will rotate along. The hub and the wind turbine blades form a rotor.

The nacelle is mounted on the tower via a yaw system, thereby allowing the nacelle to rotate relative to the tower in order to appropriately align the rotor with respect to the direction of the incoming wind. In the case that the wind turbine is an upwind wind turbine, the yaw system is operated in order to direct the rotor towards the incoming wind. In the case that the wind turbine is a downwind wind turbine, the yaw system is operated in order to direct the rotor opposite to the direction of the incoming wind.

The wind turbine further comprises a generator, operatively connected to the rotating hub, optionally via a gear arrangement, for generating electrical energy from the rotating movements of the hub. An AC/DC converter is connected to the generator, and an electrolysis system for producing hydrogen is connected to the DC power output of the AC/DC converter. Accordingly, the electrolysis system forms part of the wind turbine. The AC power produced by the generator is converted into DC power by the AC/DC converter, and the DC power is supplied directly to the electrolysis system. Thus, the electrolysis system is arranged close (such as within less than for example 5-20 m) to the source of the electrical energy, and it is not necessary to convert the DC power into AC power with a suitable grid compliant frequency in order to be able to transfer the power over a long distance to a central facility and particularly not required that the electricity produced follow other stringent grid quality requirements. Thereby the DC/AC converter can be omitted, thereby saving manufacturing costs. Furthermore, power losses due to power conversion and transport are avoided.

The electrolysis system is arranged in an up-tower part of the wind turbine. In the present context the term 'up-tower part' should be interpreted to mean a part of the wind turbine which is at or near a top of the tower, and thereby close to the generator, which is normally arranged in the nacelle. The up-tower part of the wind turbine may, thus, be inside the nacelle, in a compartment mounted to the nacelle, inside the tower or mounted on an outside surface of the tower immediately below the nacelle, e.g. within the upper ¼ of the tower where blade clearance from the tower is sufficiently high to allow safe space for such a compartment. Accordingly, the production of hydrogen takes place at the up-tower part of the wind turbine, and thereby at a distance from the base part of the tower.

The hydrogen may be transported as hydrogen gas or hydrogen may converted up-tower into another energy carrier, such as for example ammonia, ethanol, or incorporated in a liquid organic hydrogen carrier (LOHC) before being transported. Hence, in the context of the present invention, hydrogen refers to both hydrogen gas and hydrogen incorporated in another energy carrier or in a liquid organic hydrogen carrier. Most advantages of the various embodiments disclosed herein concerns both hydrogen gas and hydrogen incorporated in ammonia, ethanol or LOHC. However, some advantages concern only hydrogen gas or are particularly advantageous for hydrogen gas and hence it is preferred that the hydrogen is in the form of hydrogen gas.

The wind turbine further comprises a hydrogen transport line connected to the electrolysis system for transporting hydrogen produced by the electrolysis system away from the electrolysis system, e.g. towards a pipeline, a suitable storage tank, etc.

Normally, supply lines, power cables, etc., to and from the nacelle of a wind turbine would be arranged inside the tower in order to protect such supply lines and power cables from the environment, including protection from strong winds, precipitation, salty air, lightning, wildlife, etc., and in order to ensure that the nacelle is able to perform yawing movements relative to the tower without damaging the supply lines or power cables. However, arranging a transport line for transporting hydrogen within the confined space of a wind turbine tower may introduce a risk of fire and explosions in the case that the transport line leaks or is damaged. In this case, hydrogen will enter the interior of the tower and accumulate there, since it will not be able to easily pass from the interior of the tower to the ambient. Such an accumulation of hydrogen mixed with the oxygen of the air may easily be ignited, thereby causing a fire or even an explosion.

However, in the wind turbine according to the invention, the hydrogen transport line extends along an exterior surface of the tower from the position of the electrolysis system, i.e. from the up-tower position, to a lower part of the tower, e.g. to a position at or near the base of the tower, i.e. to the position where the tower is connected to a foundation, a monopile, a transition piece or the like.

Since the hydrogen transport line extends along the exterior surface of the tower, the hydrogen produced by the electrolysis system can be transported from the up-tower position, e.g. from the nacelle, and out of the wind turbine towards a pipeline or a suitable storage tank without risking hydrogen leaks inside the wind turbine, notably inside the tower. Thereby the risk of fire and explosions is significantly reduced. In particular, the full length of the tower will not be prone to such hydrogen leaks and associated risks for personnel and equipment despite the energy optimal up-tower positioning of the electrolyser.

Thus, the wind turbine according to the invention allows production of hydrogen in a cost effective and safe manner, in particular in a manner which significantly reduces the risk for personnel and equipment of fire and explosions in the wind turbine, notably in the tower.

The electrolysis system may be arranged inside the nacelle. According to this embodiment, the electrolysis system is arranged close to the generator and the AC/DC converter, which are normally both arranged in the nacelle. Furthermore, the electrolysis system is arranged within a part of the wind turbine which is already there for housing other components of the wind turbine, and the electrolysis system is shielded by the outer walls of the nacelle. Finally, the electrolysis system rotates along with the nacelle when the nacelle performs yawing movements so yawing capable electrical transport of high power cables may be avoided.

As an alternative, the wind turbine may further comprise one or more closed, closable or sealable compartments connected to the nacelle, and the electrolysis system may be arranged inside one of the one or more compartments. According to this embodiment, the electrolysis system will also rotate along with the nacelle when the nacelle performs yawing movements, since the closed, closable or sealable compartment(s) is/are connected to the nacelle. However, in this case the electrolysis system is arranged inside a compartment which can be separated or isolated from the interior of the nacelle. Thereby the risk of hydrogen leaking inside the nacelle is significantly reduced which reduces the risk for personnel and equipment of fire and explosions in the wind turbine, notably in the nacelle. The compartment may form part of the nacelle but be separated in a sealable manner allowing no access for hydrogen from the compartment to the main part of the nacelle during operation of the electrolyser.

The compartment housing the electrolysis system may be completely closed towards the nacelle. As an alternative, one or more gas sealable doors, hatches or the like may be provided between the interior of the nacelle and the compartment, in order to provide access to the electrolysis system, e.g. for maintenance personnel.

The compartment(s) may, e.g., be connected to the nacelle along the sides of the nacelle extending between a front surface where the hub is mounted on the nacelle and a rear surface arranged opposite thereto. As an alternative, the compartment(s) may be connected to the nacelle along the rear surface, along a top surface or along a bottom surface at a position which is non-overlapping with the interface between the tower and the nacelle.

The wind turbine may further comprise a yaw system interconnecting the tower and the nacelle, and the yaw system may be provided with a transport line guiding mechanism for guiding the hydrogen transport line past the yaw system from the nacelle to the exterior surface of the tower.

Since the hydrogen transport line extends along the exterior surface of the tower, it remains immovable with respect to the tower during yawing of the nacelle. However, if the electrolysis system rotates along with the nacelle, e.g. when the electrolysis system is arranged inside the nacelle or inside a compartment connected to the nacelle, there is a need to connect the electrolysis system and the hydrogen transport line in a manner which does not inhibit yawing of the nacelle, and which does not introduce a risk of hydrogen leaks.

According to this embodiment, the transport line guiding mechanism provides such a connection between the electrolysis system arranged fixedly with respect to the nacelle, and the hydrogen transport line extending along the exterior surface of the tower, allowing for yawing of the nacelle relative to the tower. In other words, the transport line guiding mechanism guides the hydrogen transport line safely past the yaw system, past the mutually movable parts, without inhibiting the ability of the yaw system to perform yawing movements or damaging the hydrogen transport line.

The transport line guiding mechanism may comprise a cable chain. In the present context the term 'cable chain' should be interpreted to mean a chained structure designed for accommodating a flexible cable, hose or the like, in a manner which allows the cable or hose to be winded and un-winded as a part, which the cable or hose is connected to, moves. Cable chains may also be referred to as cable carriers, drag chains or energy chains.

Thus, cable chains are suitable for guiding the hydrogen transport line past the yaw system, while protecting the hydrogen transport line and allowing appropriate operation of the yaw system.

As an alternative, the transport line guiding mechanism may comprise a cable trolley, or any other suitable kind of guiding mechanism.

The transport line guiding mechanism may be arranged in a gas tight compartment. According to this embodiment, the transport line guiding mechanism, and thereby the hydrogen transport line being guided by the transport line guiding mechanism, is accommodated in a gas tight compartment. Thereby, in the case of a hydrogen leak from this part of the hydrogen transport line, the leaked hydrogen will be confined to the gas tight compartment, and hydrogen will not enter other parts of the wind turbine, such as the nacelle or the tower. Accordingly, the tower and the nacelle remain safe spaces. Due to the moving nature of the transport line guiding mechanism and hydrogen transport line interaction with the transport line guiding mechanism there is an increased risk of leak of hydrogen in the compartment. It is preferred to place a suitable sensor (such as a hydrogen sensor) in the compartment for early detection of damage to the hydrogen transport line so proper steps can be taken before a dangerous situation may arise. Also, this allows for confirming no presence of hydrogen before accessing the gastight compartment as a safety precaution.

The gas tight compartment may be provided with blast panels as a feature. According to this embodiment, in the case of a hydrogen leak in the gas tight compartment, where the hydrogen is confined to the gas tight compartment as described above, a possible explosion following the leak will blow out the blast panels. Thereby other parts of the wind turbine, such as the nacelle and the tower, will not be affected by such an explosion, and it will be safe for personnel to be present inside the wind turbine. Particularly, it is preferred that the blast panels are arrange in a direction of reduced risk such as tangential to the tower or downwards away from the nacelle.

The gas tight compartment may be provided as a feature with one or more hatches allowing access to the interior of the gas tight compartment from the nacelle and/or from the tower. According to this embodiment, it will be possible for maintenance personnel to enter the gas tight compartment, via the one or more hatches, in order to perform inspection, maintenance, repair, etc. on the transport line guiding mechanism. The hatches may advantageously be provided with appropriate sealing which provides a gas tight sealing of the hatches when the hatches are closed. Furthermore, opening of the hatches may be subject to a safety check confirming that there is no safety hazard due to leaking hydrogen.

The gas tight compartment may be provided with a venting mechanism as a feature. According to this embodiment, in the case that a hydrogen leak is detected, the gas tight compartment may be vented, thereby removing the leaked hydrogen from the gas tight compartment and reducing the risk of fire and explosions. For instance, the gas tight compartment may be provided with one or more hydrogen sensors, and in the case that the hydrogen level inside the gas tight compartment exceeds a predefined threshold level, the venting mechanism may be activated, and possibly an alarm may be activated. The hydrogen sensor may be directly connected to the venting mechanism, thereby ensuring that the venting mechanism is automatically activated in the case that the predefined threshold hydrogen level is exceeded. Alternatively or additionally, the venting mechanism may be activated at fixed time intervals and optionally remotely activatable.

As an alternative to arranging the transport line guiding mechanism in a gas tight compartment, the transport line guiding mechanism may be arranged in a compartment which provides essentially free access to the exterior of the wind turbine, but which is essentially gas tight towards the nacelle and the tower. Thereby it is ensured that any leaking hydrogen is vented out of the compartment accommodating the transport line guiding mechanism, and the leaking hydrogen is prevented from entering the nacelle and the tower. This will also efficiently prevent fire or explosions in the wind turbine due to leaking hydrogen as hydrogen may be prevented from reaching flammable concentration by the natural dilution of hydrogen in the compartment.

As an alternative to arranging the electrolysis system in the nacelle or in a compartment connected to the nacelle, the electrolysis system may be mounted on the exterior surface of the tower, at a position near the nacelle, such as within the upper ¼ of the tower. According to this embodiment, the electrolysis system is arranged immovably with respect to the tower and to the hydrogen transport line. Thus, according to this embodiment, it is not necessary to guide the hydrogen transport line past the yaw system. Instead, a DC power connection must be provided across the yaw system, in order to connect the DC power output of the AC/DC converter to the electrolysis system. However, such power connections past a yaw system are known per se or may be of the same type as described above for the hydrogen transport line.

The hydrogen transport line may be reinforced in a region along a length of the tower which corresponds to tower passage of blade tip region of the wind turbine blades. For wind turbine blades with pre-bending of outer part, it may not be the very tip that has the highest risk of hitting the tower. Hence, here blade tip region refers to the outer part of the blade which may be of risk of hitting the tower under extreme wind gusts and typically corresponds to the region of 0-5 meters from the blade tip.

Since the hydrogen transport line extends along an exterior surface of the tower, it is not shielded by the walls of the tower, and it is therefore subjected to impacts from various risk factors present in the ambient environment of the wind turbine. One of these risk factors is the risk of collisions between the blade tip region of the wind turbine blades and the tower. If such a collision occurs in the part of the wind turbine tower where the hydrogen transport line is positioned, this may cause significant damage to the hydrogen transport line.

Thus, according to this embodiment, the hydrogen transport line is reinforced in the region where the blade tip region may collide with the tower under very extreme wind gusts, and thereby with the hydrogen transport line. Thereby the risk of causing damage to the hydrogen transport line, due to blade tip collisions, is significantly reduced. Furthermore, by reinforcing only the part of the hydrogen transport line where there is a risk of collisions with blade tip region, the risk reduction is obtained in a cost effective manner.

The hydrogen transport line may extend along a leeward side of the tower with respect to a dominating wind direction at the location of the wind turbine.

In the present context the term 'dominating wind direction' should be interpreted to mean a wind direction which occurs more often than other wind directions at the location of the wind turbine. Thus, according to this embodiment, the hydrogen transport line is arranged along the tower in such a manner that it is behind the tower, relative to the incoming wind, most of the time. Thereby, most of the time, the tower shields the hydrogen transport line from the wind, and the hydrogen transport line is positioned out of harm's way with respect to collisions with the blade tips.

The wind turbine may further comprise a lightning protection system for protecting the hydrogen transport line against lightning strikes. According to this embodiment, the risk of fire or explosions due to lightning strikes directly on the hydrogen transport line is reduced. It is an advantage to provide the hydrogen transport line with lightning protection, because it is arranged along the exterior surface of the tower, and it is therefore prone to direct lightning strikes. It is preferred that the lightning protection system of the hydrogen transport line is electrically equivalized to the down conductor system of the wind turbine generator and the tower construction (if the tower is electrically conducting) to prevent uncontrolled flash over.

The lightning protection may, e.g., comprise a metal grid arranged at the outer part of or immediately above the hydrogen transport line. The metal grid may be connected to an electrically conductive line, e.g. forming part of the hydrogen transport line itself. For instance, the hydrogen transport line may comprise a built-in metal grid or the hydrogen transport line may be arranged in a conductive tube. In the latter case, the construction may further act as a hydrogen collector for detecting hydrogen leaks, e.g. by regularly or continuously measuring hydrogen accumulation in the conductive tube, e.g. by means of a gas flow sensor or a diffusion sensor arranged at the top of the conductive tube.

The hydrogen transport line may be or comprise a flexible hose. According to this embodiment, the hydrogen transport line will be able to bend to a certain extent without risking damage to the hydrogen transport line. This reduces the risk of hydrogen leaks. Furthermore, a flexible hydrogen transport line was found to be particularly advantageous if the hydrogen transport line is arranged helically around the tower as this allows for easy and fast securing of the hydrogen transport line to the tower by applying tension in the flexible hose, so the hydrogen transport line is forced towards the tower.

The hydrogen transport line may be arranged helically around the tower along a majority of the tower. This may have one or more of several advantages. For example, it may reduce vortex induced vibrations and/or it may allow for securing of the hydrogen transport line to the tower without need for fixation elements along the whole height of the tower by tensioning the hydrogen transport line, so it is forced towards the tower.

The hydrogen transport line may be at least temporarily secured to the tower by tensioning the hydrogen transport line. Since tensioning of the hydrogen transport line will force the hydrogen transport line towards the tower and hence allow for a fast way for installation. Furthermore, securing the hydrogen transport line by tensioning allows for quick release of the hydrogen transport line in case of servicing of blades requiring for example a blade access tool to be supported towards the tower.

It was found to be generally advantageous that the hydrogen transport line is releasably connected near the bottom of the tower as this allows for temporary alternative connections to the hydrogen transport line or to unwind the helical winding of the hydrogen transport line if access to the tower surface is required. The hydrogen transport line is preferably equipped with a quick release connection at the end at the bottom of the tower and further preferably a one way valve ensuring nothing will enter into the hydrogen transport line from the bottom unless required so for example if the wind turbine is equipped with a fuel cell near the top of the tower.

Another aspect of the invention concerns a method of retrofitting a wind turbine with an electrolysis system. The wind turbine comprising a tower, a nacelle mounted rotatably on the tower via a yaw system and a hub carrying one or more wind turbine blades, where the hub is mounted rotatably on the nacelle. The method comprises the step of providing an electrolysis system in an up-tower part of the wind turbine. This is preferably in a separate compartment for example in the nacelle, in the upper part of the tower or most preferably in a compartment arranged outside (such as next to, under or behind) the main nacelle or arranged on the outer surface of the tower. The method also comprises the step of providing a water transport line between the bottom of the tower and the electrolysis system and providing a hydrogen transport line extending along an exterior surface of the tower between the electrolyser and the bottom of the tower and along an exterior surface of the tower. Preferably the hydrogen transport line is arranged helically along a majority of the tower. The water transport line may be arranged with the hydrogen transport line or inside the tower.

BRIEF DESCRIPTION OF THE DRAWINGS

The invention will now be described in further detail with reference to the accompanying drawings in which.

DETAILED DESCRIPTION OF THE DRAWINGS

Figure 1A:
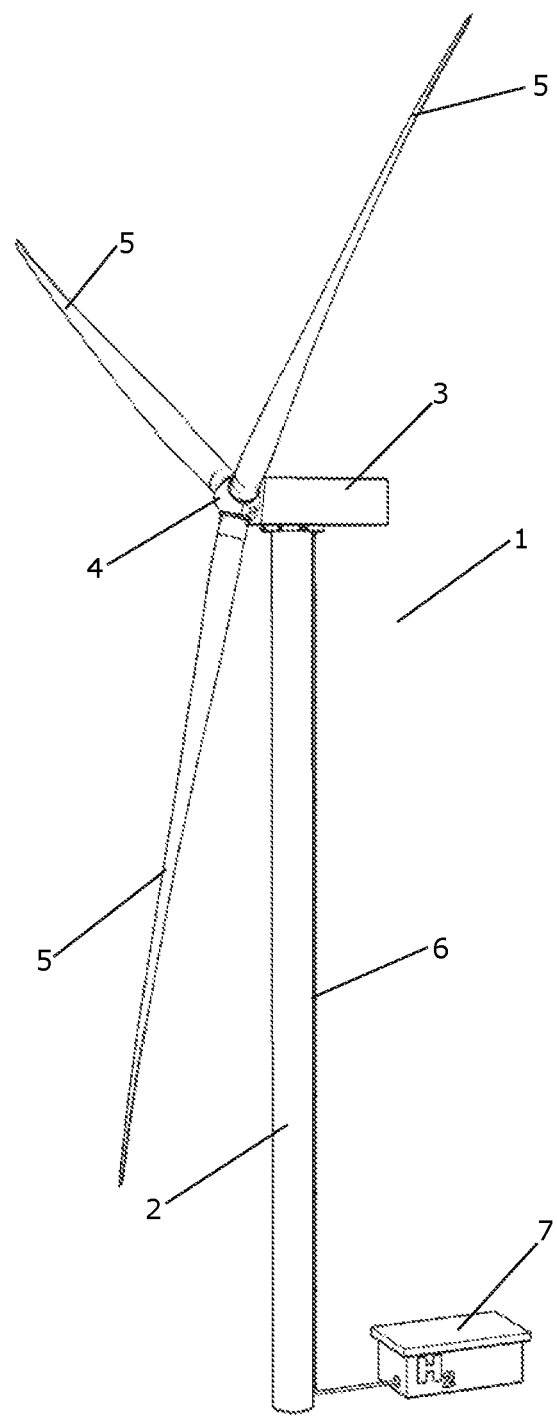
FIGS. 1A and 1B are perspective views of wind turbines according to embodiments of the invention.
Figure 1B:
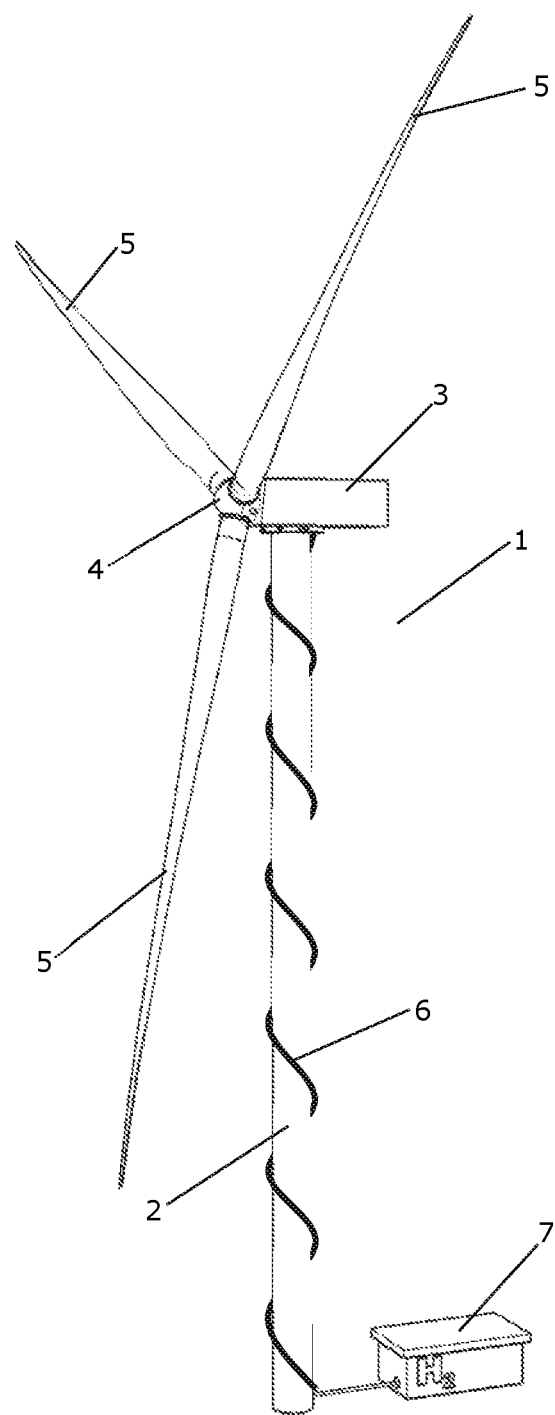

FIGS. 1A and 1B are perspective views of wind turbines 1 according to embodiments of the invention. The wind turbine 1 comprises a tower 2 and a nacelle 3 mounted rotatably on the tower 2. A hub 4 is mounted rotatably on the nacelle 3 and carries three wind turbine blades 5.

The wind turbine 1 further comprises an electrolysis system (not shown) arranged in the nacelle 3, and electrically connected directly to a DC power output of an AC/DC converter (not shown) of the wind turbine 1, also arranged in the nacelle 3. Accordingly, the electrolysis system produces hydrogen, in the nacelle 3, using DC power produced by the wind turbine 1.

A hydrogen transport line 6 extends along an exterior surface of the tower 2, and interconnects the electrolysis system inside the nacelle 3 and a hydrogen ground station 7 arranged on the ground at the foot of the wind turbine 1. In FIG. 1A, the hydrogen transport line 6 is arranged substantially vertically on the outer surface of the tower 2, whereas the hydrogen transport line 6 of FIG. 1B is arranged helically around the tower. Accordingly, hydrogen produced by the electrolysis system is transported from the electrolysis system to the hydrogen ground station 7, via the hydrogen transport line 6. Thereby the produced hydrogen is transported outside the tower 2, thereby minimising the risk of fire or explosions inside the tower 2, due to leaking hydrogen. Alternatively, the hydrogen transport line 6 may interconnect the electrolysis system directly to a local hydrogen grid or a hydrogen export pipe (not shown) via a valve (not shown) so local storage of hydrogen may be omitted. In this case, it is highly preferred that the valve is a check valve or another one-way or non-return valve ensuring that hydrogen may only move from the wind turbine generator and into the local hydrogen grid or hydrogen export pipe and not the opposite direction into the wind turbine generator.

Figure 2:
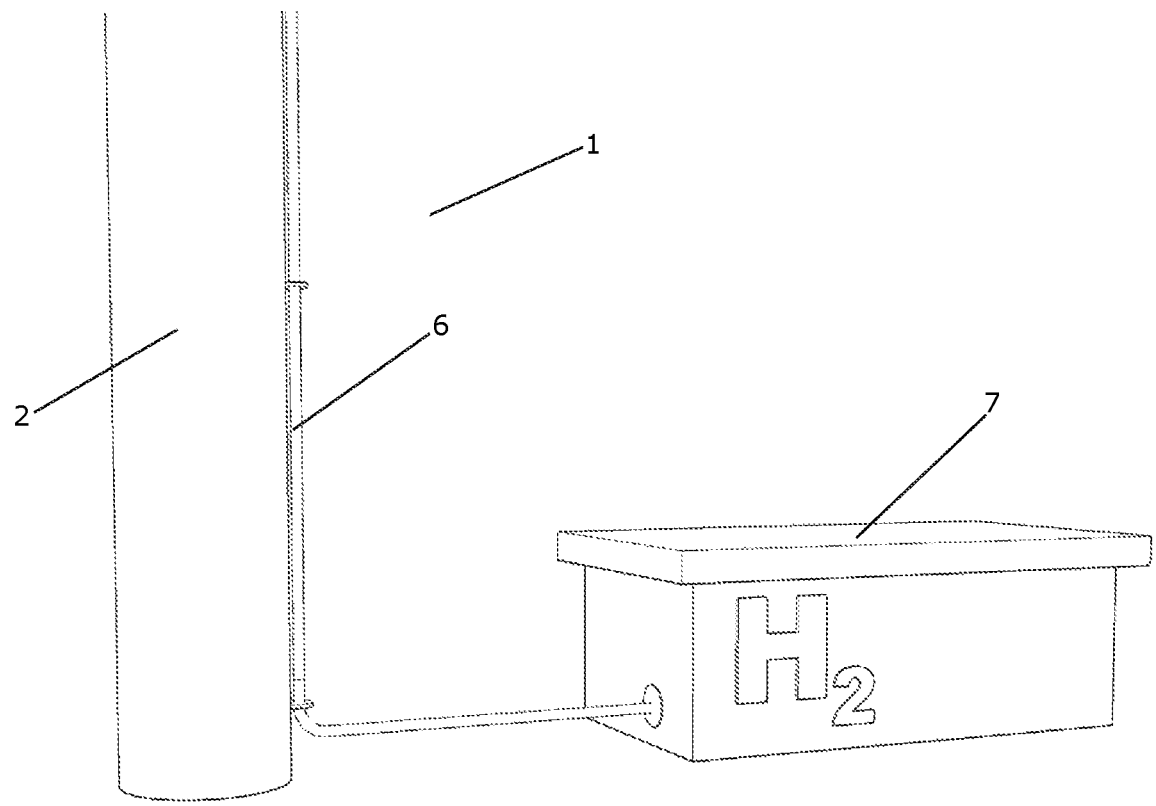
FIGS. 2 and 3 show details of the wind turbine of FIG. 1A, FIGS. 4-6 illustrate a gas tight compartment housing a transport line guiding mechanism for a wind turbine according to an embodiment of the invention.

FIG. 2 shows a detail of the wind turbine 1 of FIG. 1, illustrating a lower part of the tower 2, with the hydrogen transport line 6 extending along the exterior surface of the tower 2. FIG. 2 further shows that the hydrogen transport line 6 enters the hydrogen ground station 7. The ground station may for example comprise one or more of a storage facility, a pumping facility for increasing the pressure of the hydrogen, a hydrogen conversion facility for converting hydrogen into another energy carrier, such as for example ammonia, ethanol, or incorporated in a liquid organic hydrogen carrier (LOHC) (for example if such a conversion was not already conducted up-tower), one or more valves (such as one way valves or safety valves), and a water treatment plant for cleaning and transporting water from ground level to the electrolysis system.

Figure 3:
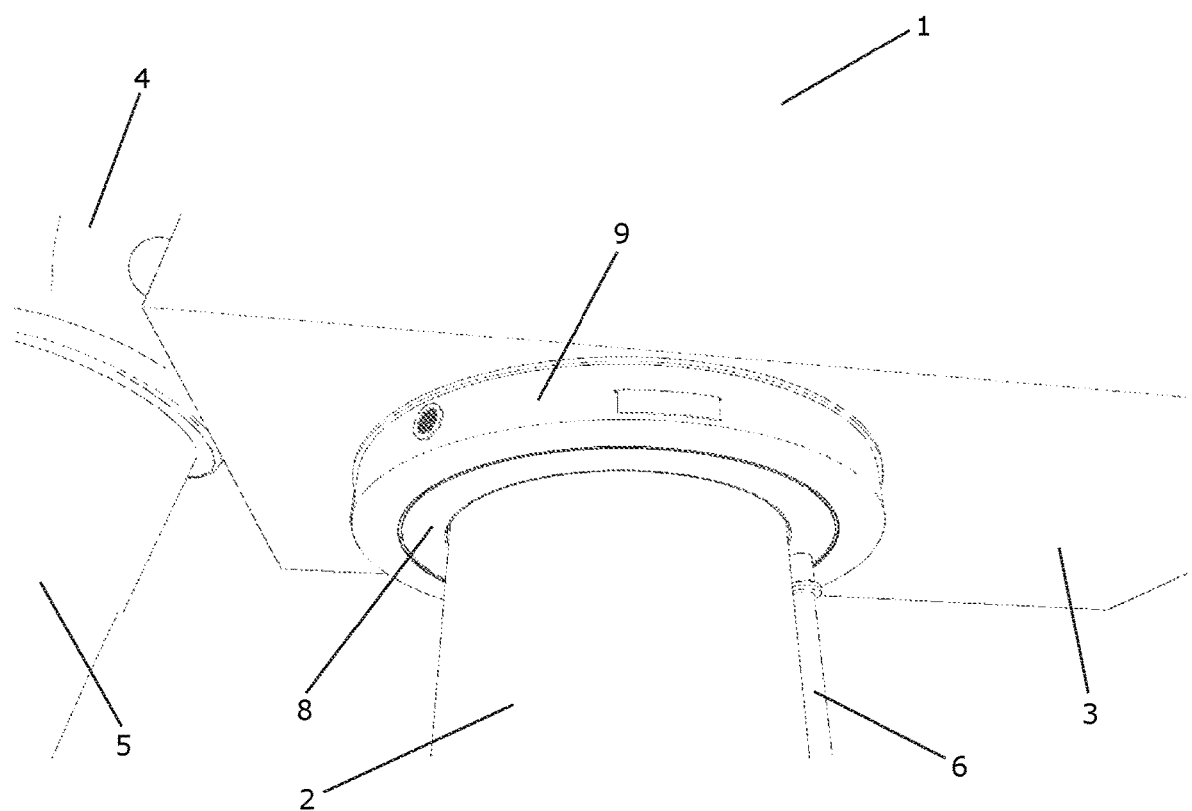

FIG. 3 shows a detail of the wind turbine 1 of FIG. 1, illustrating an upper part of the tower 2, part of the nacelle 3, part of the hub 4 and part of one of the wind turbine blades 5. The hydrogen transport line 6, extending along the exterior surface of the tower 2, can also be seen.

FIG. 3 further shows a yaw system 8 interconnecting the tower 2 and the nacelle 3, thereby allowing the nacelle 3 to perform yawing movements relative to the tower 2 in order to appropriately orient the wind turbine blades 5 with respect to the incoming wind. Since the electrolysis system is arranged in the nacelle and the hydrogen transport line 6 extends along the exterior surface of the tower 2, and since the nacelle 3 performs rotating yawing movements relative to the tower 2, there is a need for appropriately guiding the hydrogen transport line 6 past the yaw system 8. To this end, a transport line guiding mechanism (not shown) is housed inside a gas tight compartment 9 arranged around the yaw system 8, immediately below the nacelle 3 and at the top of the tower 2. The gas tight compartment 9 will be described in further detail below with reference to FIGS. 4-6.

Even though FIGS. 2 and 3 display a vertically arranged hydrogen transport line 6, similar systems may also be used when the hydrogen transport line 6 is helically arranged as indicated in FIG. 1B.

Figure 4:
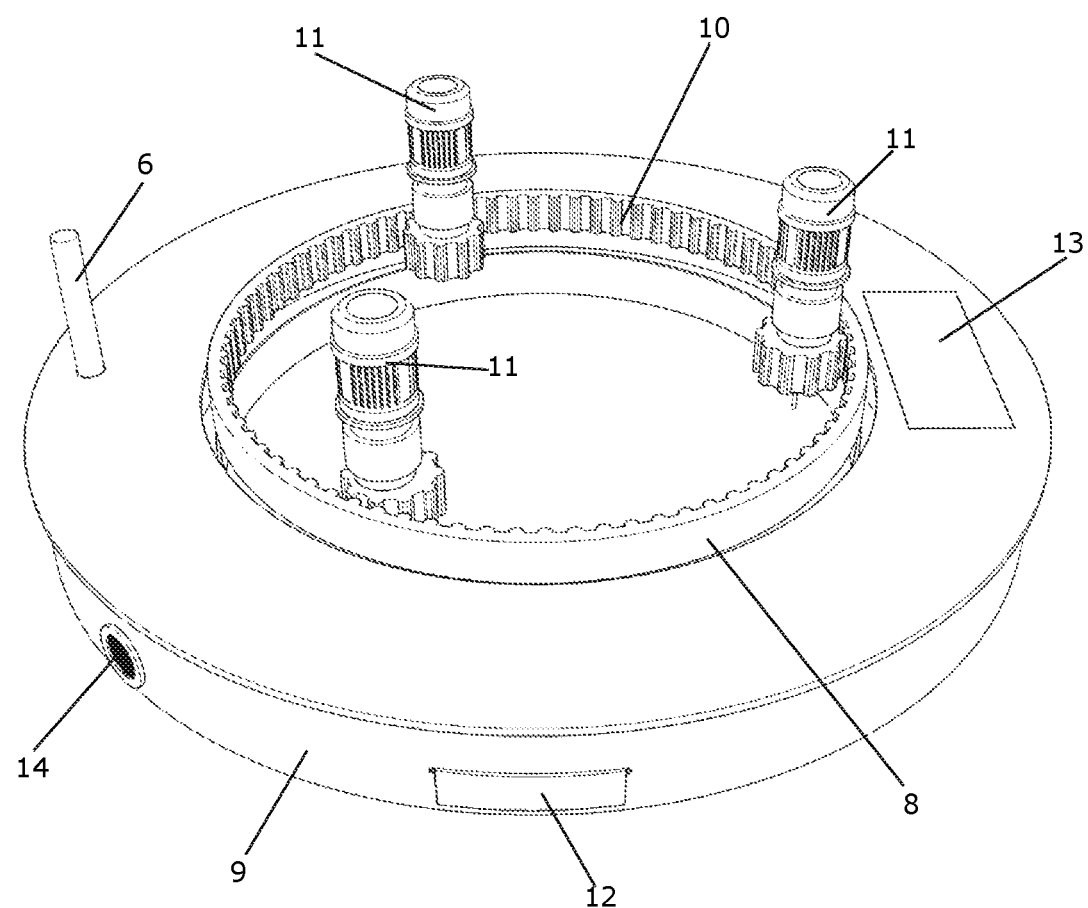
Figure 5:
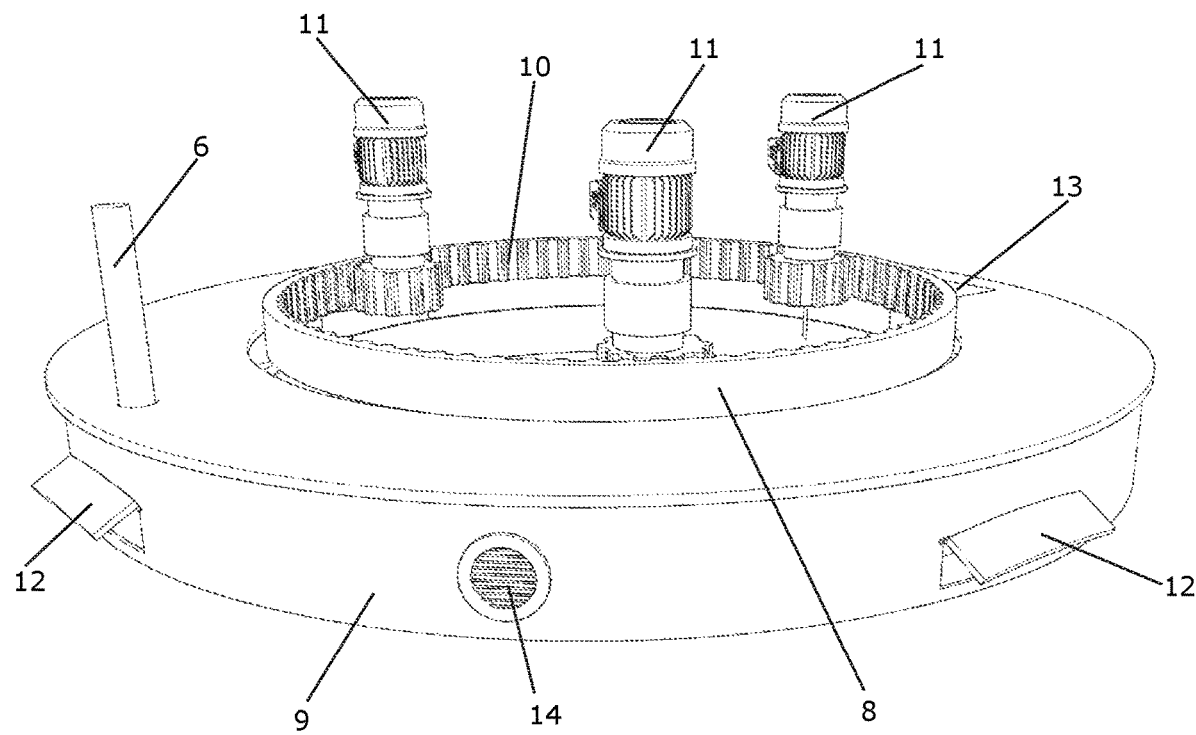
Figure 6:
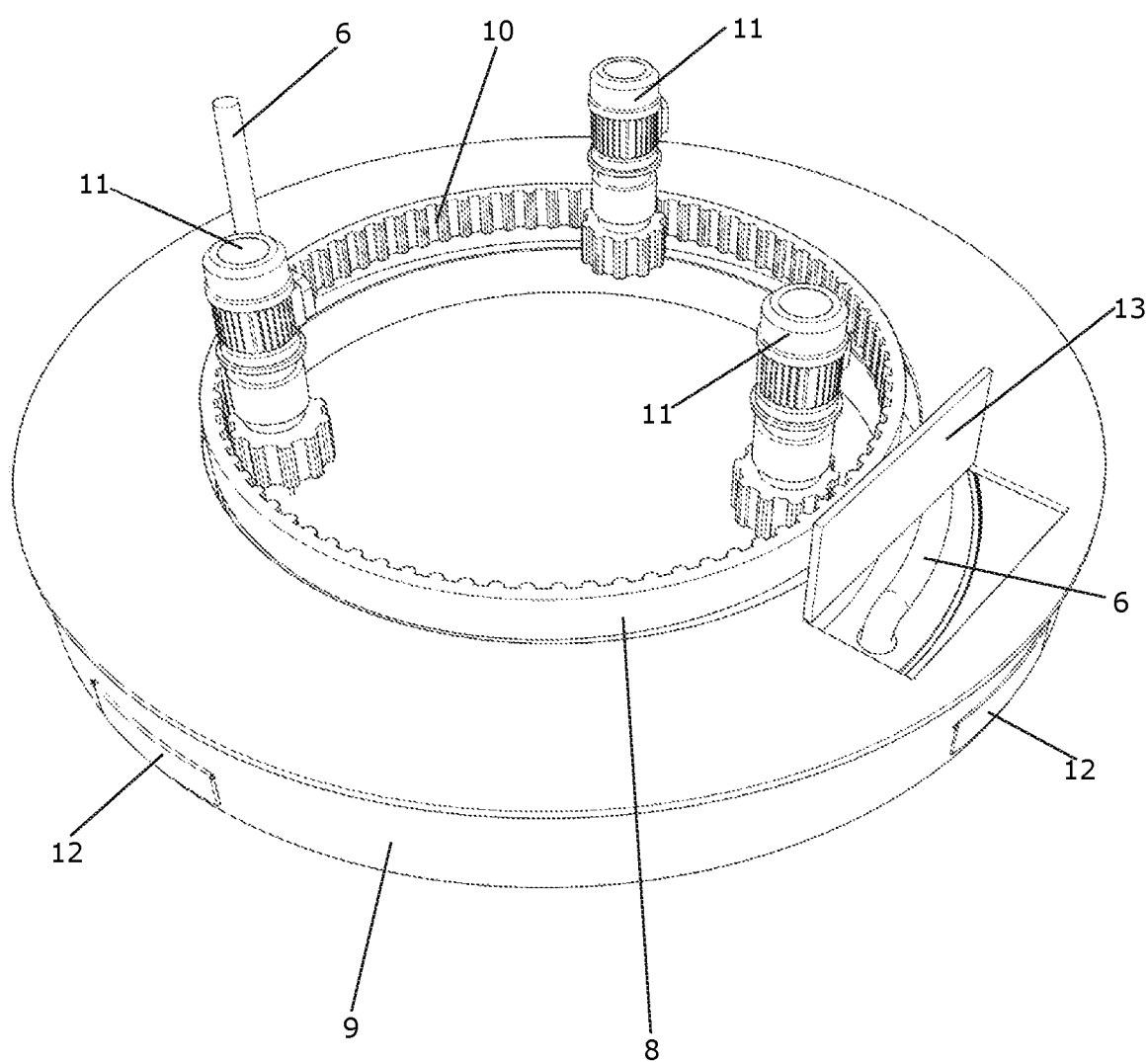

FIGS. 4-6 are perspective views of a gas tight compartment 9 housing a transport line guiding mechanism (not shown) for a wind turbine according to an embodiment of the invention. The gas tight compartment 9 may be mounted on the wind turbine of FIG. 1, e.g. in the manner illustrated in FIG. 3.

The gas tight compartment 9 is arranged near a yaw system 8, the yaw system 8 comprising a yaw ring 10 and three yaw drives 11.

The gas tight compartment 9 is provided with a number of blast panels 12 and a hatch 13 allowing personnel to access the interior of the gas tight compartment 9 from the nacelle. Furthermore, the gas tight compartment 9 is provided with a number of venting channels 14 forming part of a venting system allowing leaked hydrogen to be vented from the gas tight compartment 9. The venting system may, e.g., be controlled based on measurements from a hydrogen sensor. In this case, the gas tight compartment 9 may be vented in the case that the hydrogen sensor detects a hydrogen level inside the gas tight compartment 9 which exceeds a certain threshold level.

It can further be seen that the hydrogen transport line 6 enters the gas tight compartment 9.

By arranging the transport line guiding mechanism inside the gas tight compartment 9 it is obtained that, in the case that hydrogen leaks from the hydrogen transport line 6 at the position of the transport line guiding mechanism, the leaked hydrogen will neither enter the nacelle, nor the interior part of the tower, thereby reducing the risk of fire or explosions inside the wind turbine, due to leaking hydrogen. The risk of hydrogen leaks is relatively high at this position, since the hydrogen transport line 6 is crossing parts which move relative to each other.

The blast panels 12 are designed to blow out in the case of an explosion inside the gas tight compartment 9. Accordingly, if hydrogen leaks from the hydrogen transport line 6 and causes an explosion inside the gas tight compartment 9, the blast panels 12 will blow out, but no further damage will be caused to the gas tight compartment 9 or to other parts of the wind turbine, notably to the nacelle and to the tower.

In FIG. 4, the blast panels 12 as well as the hatch 13 are closed. Accordingly, the gas tight compartment 9 is sealed, and thereby truly gas tight.

In FIG. 5, the hatch 13 is closed. However, the blast panels 12 are open, thereby indicating that an explosion has taken place inside the gas tight compartment 9, which has caused the blast panels 12 to blow out. It can be seen that the rest of gas tight compartment 9, as well as the yaw system 8, remains intact. The open blast panels 12 further allow any remaining hydrogen to be vented from the gas tight compartment 9.

In FIG. 6, the blast panels 12 are closed, but the hatch 13 is open, thereby allowing personnel to enter, from the nacelle, the interior of the gas tight compartment 9, e.g. in order to inspect or perform maintenance on the transport line guiding mechanism housed inside the gas tight compartment 9. Part of the hydrogen transport line 6 can be seen through the open hatch 13.

Figure 7:
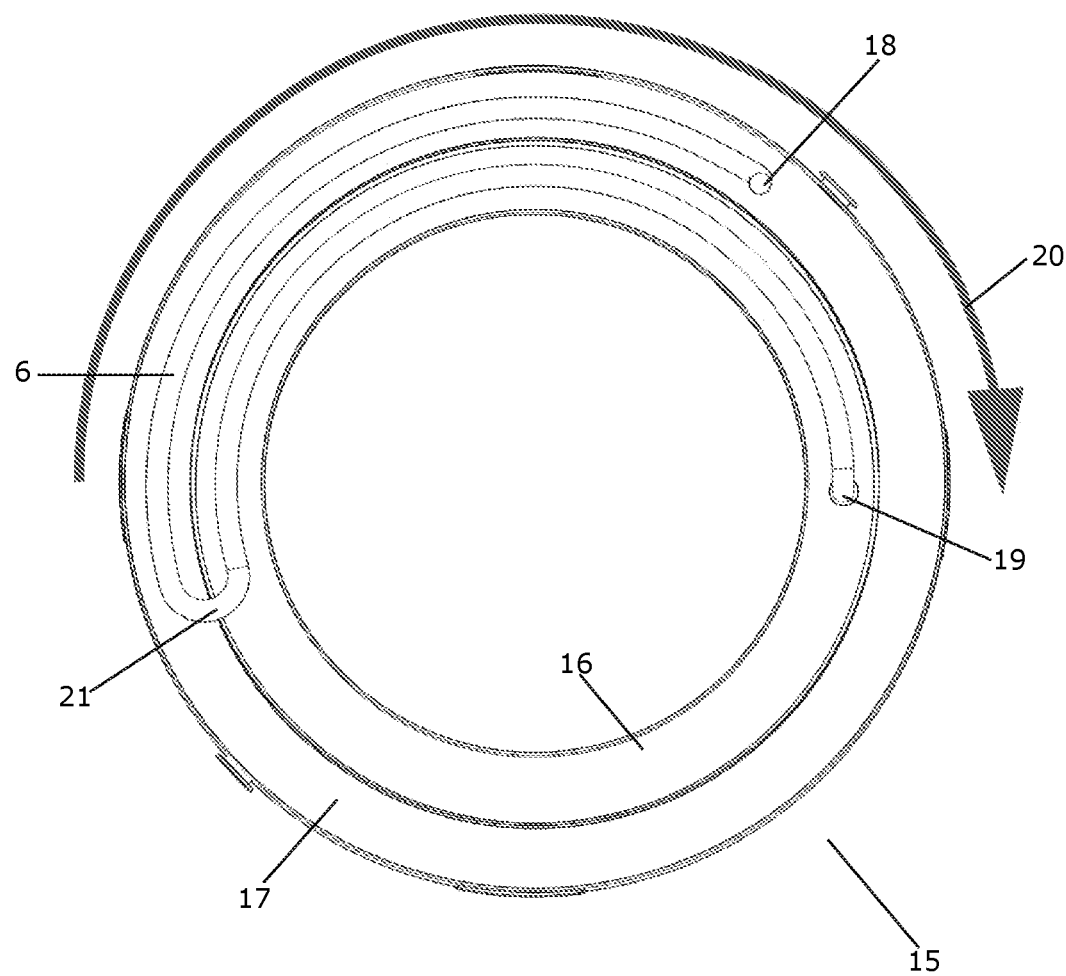
FIGS. 7 and 8 illustrate a transport line guiding mechanism for a wind turbine according to an embodiment of the invention in two different yaw positions, FIG. 9 illustrate a transport line guide mechanism with two transport lines and a visible cable chain.
Figure 8:
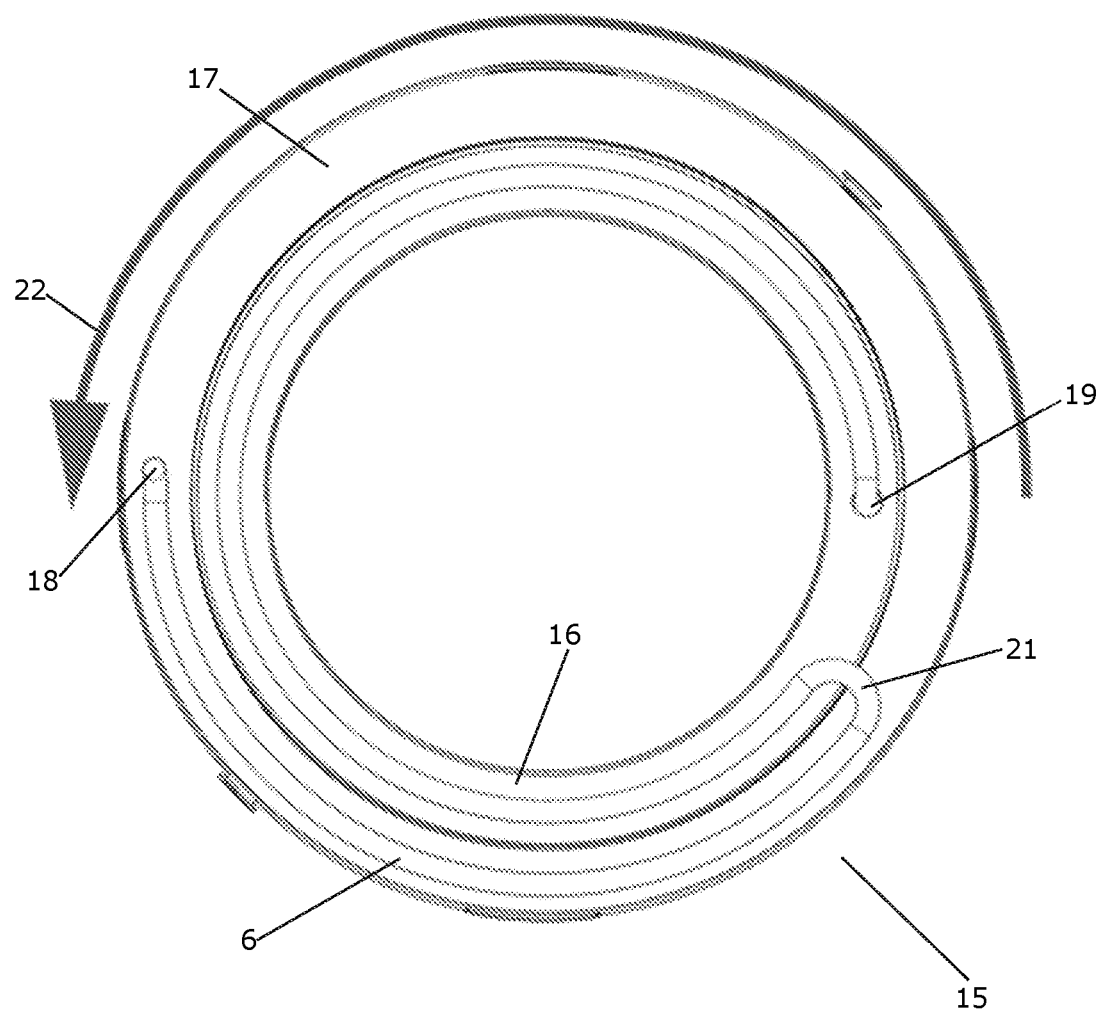

FIGS. 7 and 8 illustrate a transport line guiding mechanism 15, in the form of a cable chain, for a wind turbine according to an embodiment of the invention, in two different yaw positions. The transport line guiding mechanism 15 comprises a first part 16 connected to the tower of the wind turbine and a second part 17 connected to the nacelle. Thus, during yawing, the first part 16 and the second part 17 rotate relative to each other. The transport line is typically arranged inside a chain (not shown in FIGS. 7 and 8).

A hydrogen transport line 6 is arranged in the transport line guiding mechanism 15 in such a manner that it enters the transport line guiding mechanism 15 from the nacelle at entering point 18 and exits the transport line guiding mechanism 15 towards the exterior of the tower at exit point 19. Between the entering point 18 and the exit point 19, the hydrogen transport line 6 is coiled up, following a meandering path, which allows the first part 16 and the second part 17 to rotate relative to each other without damaging the hydrogen transport line 6. This is done in the following manner. It should be observed that in addition to the hydrogen transport line 6 other cables (such as for example data cables, sensor cables or power cables) and/or pipes (such as water pipe supplying water to the electrolysis system) may also be transferred between the nacelle 3 and the tower 6 via the transport line guiding mechanism 15.

In the situation illustrated in FIG. 7, the second part 17 may be rotated along with the nacelle along the direction illustrated by arrow 20, thereby moving the entering point 18 relative to the exit point 19. This will cause the hydrogen transport line 6 to uncoil, moving the bent portion 21, as the hydrogen transport line 6 is dragged along with the moving entering point 18.

In the situation illustrated in FIG. 8, the second part 17 may be rotated along with the nacelle along an opposite direction illustrated by arrow 22. This will also result in uncoiling of the hydrogen transport line 6 and movement of the bent portion 21, in a similar manner.

Thus, the coiled arrangement of the hydrogen transport line 6 allows the mutual rotating movement of the nacelle and the tower without risking damage to the hydrogen transport line 6.

In the event that range of yaw rotation achievable by the one-layered cable chain mechanism in the transport line guiding mechanism 15 is not sufficient then one or more additional layers of cable chain may be added below the cable chain shown in FIGS. 7 and 8 to increase the ability to yaw. This is particularly advantageous as it allows for a reduction in the frequency of situations where the hydrogen transport line 6 is fully untangled in one direction so forced yawing of the turbine away from a fully untangle hydrogen transport line 6 is required.

Figure 9:
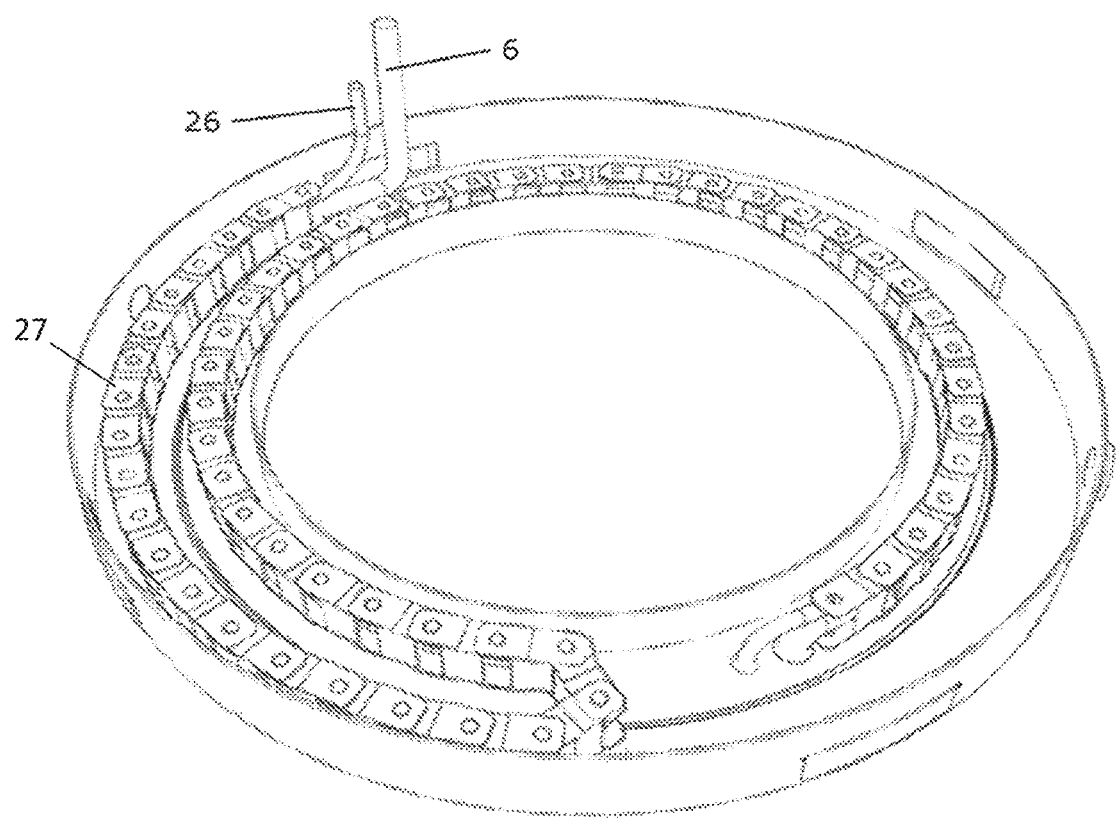

FIG. 9 illustrates the transport line guiding mechanism 15 in an exploded perspective view. Here, the chain 27 of the cable chain is shown. The cable chain supports the hydrogen transport line and further may guide the coiling/de-coiling of the hydrogen transport, protect the hydrogen transport line for example against too tight turns, kink formation, over stretching and/or mechanical damage and wear. In FIG. 9, two transport lines are shown: One hydrogen transport line 6 and a further transport line 26 for transport of water to the electrolyser in the nacelle. The further transport line 26 may alternatively be one or more cable (collections) for power transfer, data/sensor signals, and network/communication lines.

Figure 10:
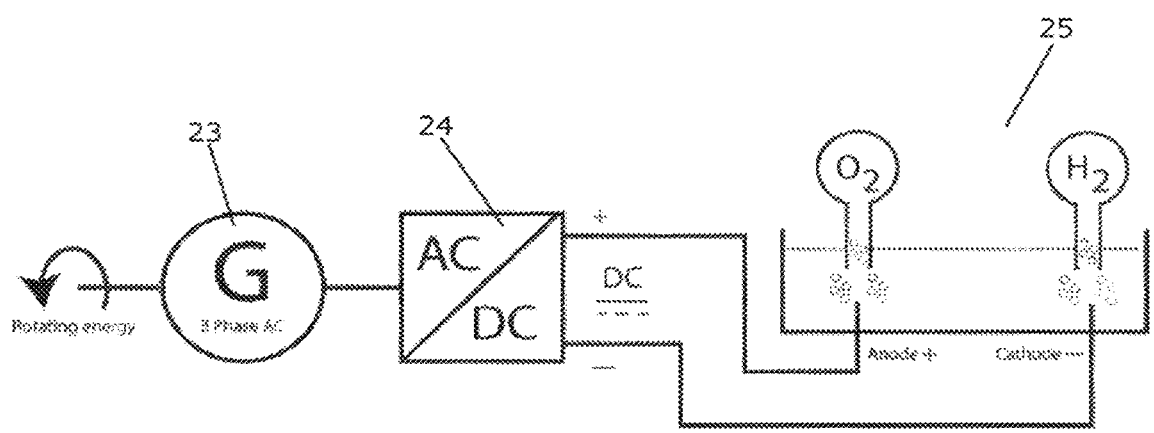
FIG. 10 is a diagrammatic view of a wind turbine according to an embodiment of the invention, including an electrolysis system.

FIG. 10 is a diagrammatic view of a wind turbine according to an embodiment of the invention. A rotating system, driven by the wind turbine blades and the hub, is connected to a generator 23 which generates AC power from the mechanical energy of the rotating system. The AC power output of the generator 23 is connected to an AC/DC converter 24, where the AC power of the generator 23 is converted into DC power. The DC power output of the AC/DC converter 24 is connected directly to an electrolysis system 25, where the DC power is applied for producing hydrogen by electrolysis.

The invention claimed is:

1. A wind turbine comprising a tower, a nacelle mounted rotatably on the tower via a yaw system, and a hub carrying one or more wind turbine blades, the hub being mounted rotatably on the nacelle, the wind turbine further comprising a generator, an AC/DC converter connected to the generator, and an electrolysis system connected to a DC power output of the AC/DC converter for producing hydrogen, the electrolysis system being arranged in an up-tower part of the wind turbine, wherein the wind turbine further comprises a hydrogen transport line connected to the electrolysis system for transporting hydrogen produced by the electrolysis system away from the electrolysis system, the hydrogen transport line extending along an exterior surface of the tower from a position of the electrolysis system to a lower part of the tower.

2. The wind turbine according to claim 1, wherein the electrolysis system is arranged inside the nacelle.

3. The wind turbine according to claim 1, wherein the wind turbine further comprises one or more closed, closable or sealable compartments connected to the nacelle, and wherein the electrolysis system is arranged inside one of the one or more compartments.

4. The wind turbine according to claim 1, further comprising the yaw system interconnecting the tower and the nacelle, wherein the yaw system is provided with a transport line guiding mechanism for guiding the hydrogen transport line past the yaw system from the nacelle to the exterior surface of the tower, preferably.

5. The wind turbine according to claim 4, wherein the transport line guiding mechanism is arranged in a gas tight compartment.

6. The wind turbine according to claim 5, wherein the gas tight compartment is provided with at least one feature selected from the group consisting of a blast panel, a hatch allowing access to an interior of the gas tight compartment from the nacelle and/or from the tower or a venting mechanism.

7. The wind turbine according to claim 1, wherein the electrolysis system is mounted on the exterior surface of the tower, at a position near the nacelle.

8. The wind turbine according to claim 1, wherein the hydrogen transport line is reinforced in a region along a length of the tower which corresponds to tower passage of blade tip regions of the wind turbine blades.

9. The wind turbine according to claim 1, wherein the hydrogen transport line extends along a leeward side of the tower with respect to a dominating wind direction at a location of the wind turbine.

10. The wind turbine according to claim 1, further comprising a lightning protection system for protecting the hydrogen transport line against lightning strikes.

11. The wind turbine according to claim 1, wherein the hydrogen transport line is or comprises a flexible hose.

12. The wind turbine according to claim 1, wherein the hydrogen transport line is arranged helically around the tower along a majority of the tower.

13. The wind turbine according to claim 12, wherein the hydrogen transport line is at least temporarily secured to the tower by tensioning the hydrogen transport line.

14. The wind turbine according to claim 12, wherein the hydrogen transport line is releasably connected near a bottom of the tower.

15. A method of retrofitting a wind turbine with an electrolysis system, the wind turbine comprising a tower, a nacelle mounted rotatably on the tower via a yaw system and a hub carrying one or more wind turbine blades, the hub being mounted rotatably on the nacelle, the method comprising:

providing an electrolysis system in an up-tower part of the wind turbine, providing a water transport line between a bottom of the tower and the electrolysis system, providing a hydrogen transport line extending along an exterior surface of the tower between the electrolysis system and the bottom of the tower and along the exterior surface of the tower, the hydrogen transport line is arranged helically along a majority of the tower.

16. The method according to claim 15, wherein the electrolysis system is located in a separate compartment of the tower.

17. The method according to claim 15, further comprising the yaw system interconnecting the tower and the nacelle, wherein the yaw system is provided with a transport line guiding mechanism for guiding the hydrogen transport line past the yaw system from the nacelle to the exterior surface of the tower.

18. The method according to claim 15, wherein the hydrogen transport line is reinforced in a region along a length of the tower which corresponds to tower passage of blade tip regions of the wind turbine blades.

\* \* \* \* \*